(12) United States Patent
Horn et al.

(10) Patent No.: US 12,445,248 B2
(45) Date of Patent: Oct. 14, 2025

(54) TIME DOMAIN COMMUNICATIONS HAVING MULTIPLE MODULATION AND CODING SCHEMES

(71) Applicant: QUALCOMM Incorporated, San Diego, CA (US)

(72) Inventors: Idan Michael Horn, Hod Hasharon (IL); Shay Landis, Hod Hasharon (IL); Assaf Touboul, Netanya (IL); Yehonatan Dallal, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 707 days.

(21) Appl. No.: 17/657,681

(22) Filed: Apr. 1, 2022

(65) Prior Publication Data

US 2023/0318778 A1    Oct. 5, 2023

(51) Int. Cl.
*H04L 5/00* (2006.01)
*H04L 1/00* (2006.01)

(52) U.S. Cl.
CPC .......... *H04L 5/0051* (2013.01); *H04L 1/0003* (2013.01); *H04L 1/0009* (2013.01); *H04L 5/006* (2013.01)

(58) Field of Classification Search
None
See application file for complete search history.

(56) References Cited

U.S. PATENT DOCUMENTS

| | | | |
|---|---|---|---|
| 11,202,198 B1* | 12/2021 | Newman | H04W 72/23 |
| 2016/0269047 A1* | 9/2016 | Jiang | H03M 13/27 |
| 2018/0091959 A1* | 3/2018 | Sun | H04W 52/262 |
| 2019/0245656 A1* | 8/2019 | Baghel | H04L 1/08 |
| 2021/0135717 A1* | 5/2021 | Huang | H04L 1/0003 |
| 2021/0176657 A1* | 6/2021 | Yang | H04L 5/0048 |
| 2024/0031060 A1* | 1/2024 | Yang | H04L 1/0041 |
| 2024/0039668 A1* | 2/2024 | Xu | H04L 5/00 |
| 2024/0171342 A1* | 5/2024 | Ma | H04L 25/0224 |

* cited by examiner

*Primary Examiner* — Jeffrey M Rutkowski
*Assistant Examiner* — Justin Michael Whitaker
(74) *Attorney, Agent, or Firm* — Harrity & Harrity LLP

(57) ABSTRACT

Various aspects of the present disclosure generally relate to wireless communication. In some aspects, a user equipment (UE) may transmit an indication of a capability to receive or transmit a time domain communication having a first portion of a symbol configured with a first modulation and coding scheme (MCS) and a second portion of the symbol configured with a second MCS that is different from the first MCS. The UE may receive or transmit the time domain communication having the first portion configured with the first MCS and the second portion configured with the second MCS. Numerous other aspects are described.

30 Claims, 9 Drawing Sheets

TIME DOMAIN COMMUNICATIONS HAVING MULTIPLE MODULATION AND CODING SCHEMES

FIELD OF THE DISCLOSURE

Aspects of the present disclosure generally relate to wireless communication and to techniques and apparatuses for time domain communications having multiple modulation and coding schemes.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting an indication of a capability to receive or transmit a time domain communication having a first portion of a symbol configured with a first modulation and coding scheme (MC S) and a second portion of the symbol configured with a second MCS that is different from the first MCS. The method may include receiving or transmitting the time domain communication having the first portion configured with the first MCS and the second portion configured with the second MCS.

Some aspects described herein relate to a method of wireless communication performed by a network node. The method may include receiving an indication of a capability of a UE to receive or transmit a time domain communication having a first portion of a symbol configured with a first MCS and a second portion of the symbol configured with a second MCS that is different from the first MCS. The method may include transmitting or receiving the time domain communication having the first portion configured with the first MCS and the second portion configured with the second MCS.

Some aspects described herein relate to a UE for wireless communication. The user equipment may include a memory and one or more processors coupled to the memory. The one or more processors may be configured to transmit an indication of a capability to receive or transmit a time domain communication having a first portion of a symbol configured with a first MCS and a second portion of the symbol configured with a second MCS that is different from the first MCS. The one or more processors may be configured to receive or transmit the time domain communication having the first portion configured with the first MCS and the second portion configured with the second MCS.

Some aspects described herein relate to a network node for wireless communication. The network node may include a memory and one or more processors coupled to the memory. The one or more processors may be configured to receive an indication of a capability of a UE to receive or transmit a time domain communication having a first portion of a symbol configured with a first MCS and a second portion of the symbol configured with a second MCS that is different from the first MCS. The one or more processors may be configured to transmit or receiving the time domain communication having the first portion configured with the first MCS and the second portion configured with the second MCS.

Some aspects described herein relate to a non-transitory computer-readable medium that stores a set of instructions for wireless communication by a UE. The set of instructions, when executed by one or more processors of the UE, may cause the UE to transmit an indication of a capability to receive or transmit a time domain communication having a first portion of a symbol configured with a first MCS and a second portion of the symbol configured with a second MCS that is different from the first MCS. The set of instructions, when executed by one or more processors of the UE, may cause the UE to receive or transmit the time domain communication having the first portion configured with the first MCS and the second portion configured with the second MCS.

Some aspects described herein relate to a non-transitory computer-readable medium that stores a set of instructions for wireless communication by a network node. The set of instructions, when executed by one or more processors of the network node, may cause the network node to receive an indication of a capability of a UE to receive or transmit a time domain communication having a first portion of a symbol configured with a first MCS and a second portion of the symbol configured with a second MCS that is different from the first MCS. The set of instructions, when executed by one or more processors of the network node, may cause the network node to transmit or receiving the time domain communication having the first portion configured with the first MCS and the second portion configured with the second MCS.

Some aspects described herein relate to an apparatus for wireless communication. The apparatus may include means for transmitting an indication of a capability to receive or transmit a time domain communication having a first portion of a symbol configured with a first MCS and a second portion of the symbol configured with a second MCS that is different from the first MCS. The apparatus may include means for receiving or transmitting the time domain communication having the first portion configured with the first MCS and the second portion configured with the second MCS.

Some aspects described herein relate to an apparatus for wireless communication. The apparatus may include means for receiving an indication of a capability of a UE to receive or transmit a time domain communication having a first portion of a symbol configured with a first MCS and a second portion of the symbol configured with a second MCS that is different from the first MCS. The apparatus may include means for transmitting or receiving the time domain communication having the first portion configured with the first MCS and the second portion configured with the second MCS.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
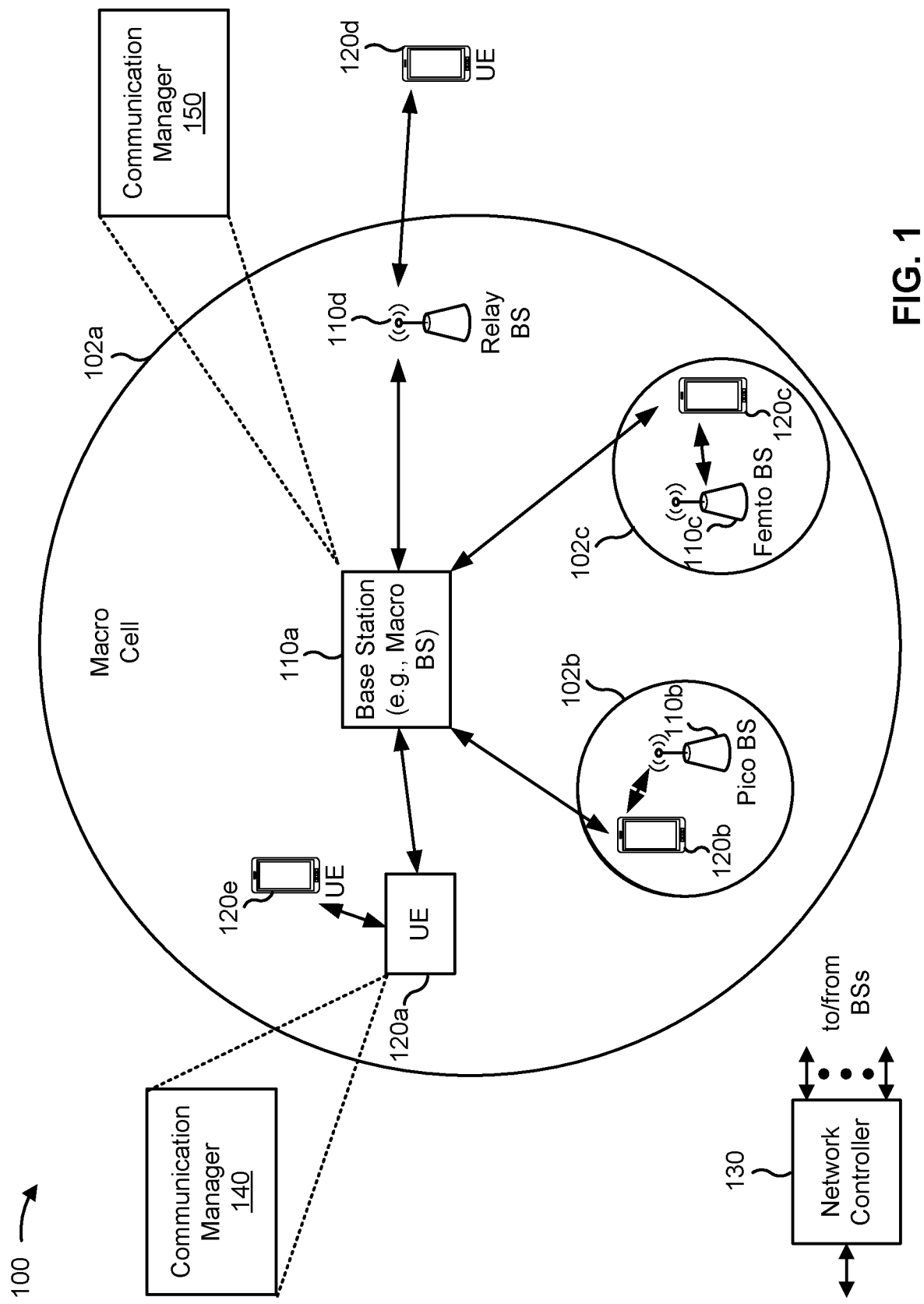
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit an indication of a capability to receive or transmit a time domain communication having a first portion of a symbol configured with a first modulation and coding scheme (MCS) and a second portion of the symbol configured with a second MCS that is different from the first MCS; and receive or transmit the time domain communication having the first portion configured with the first MCS and the second portion configured with the second MCS. Additionally, or alternatively, the communication manager 140 may perform one or more other operations described herein.

In some aspects, a network node (e.g., base station 110 or one or more devices associated with the base station 110) may include a communication manager 150. As described in more detail elsewhere herein, the communication manager 150 may receive an indication of a capability of a UE to receive or transmit a time domain communication having a first portion of a symbol configured with a first MCS and a second portion of the symbol configured with a second MCS that is different from the first MCS; and transmit or receiving the time domain communication having the first portion configured with the first MCS and the second portion configured with the second MCS. Additionally, or alternatively, the communication manager 150 may perform one or more other operations described herein.

In some aspects, the term "base station" (e.g., the base station 110) or "network node" or "network entity" may refer to an aggregated base station, a disaggregated base station (e.g., described in connection with FIG. 9), an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) MC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

As indicated above, FIG. 1 is provided as an example. Other examples may differ from what is described with regard to FIG. 1.

Figure 2:
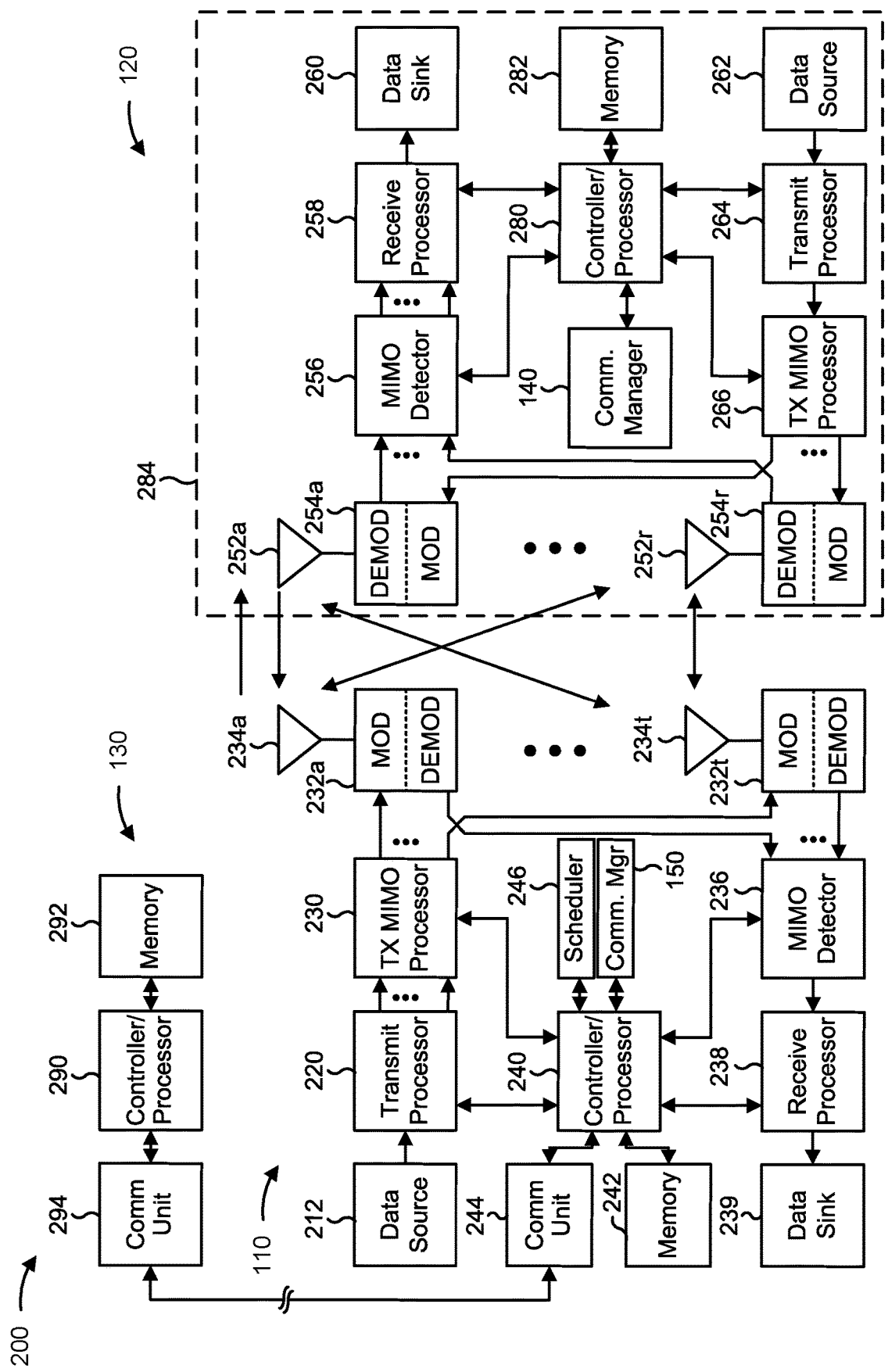
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more MCSs for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the base station 110, the controller/processor 280 of the UE 120, and/or any other component(s) of FIG. 2 may perform one or more techniques associated with time domain communications having multiple MCSs, as described in more detail elsewhere herein. In some aspects, the network node described herein is the base station 110, is included in the base station 110, or includes one or more components of the base station 110 shown in FIG. 2.

Figure 6:
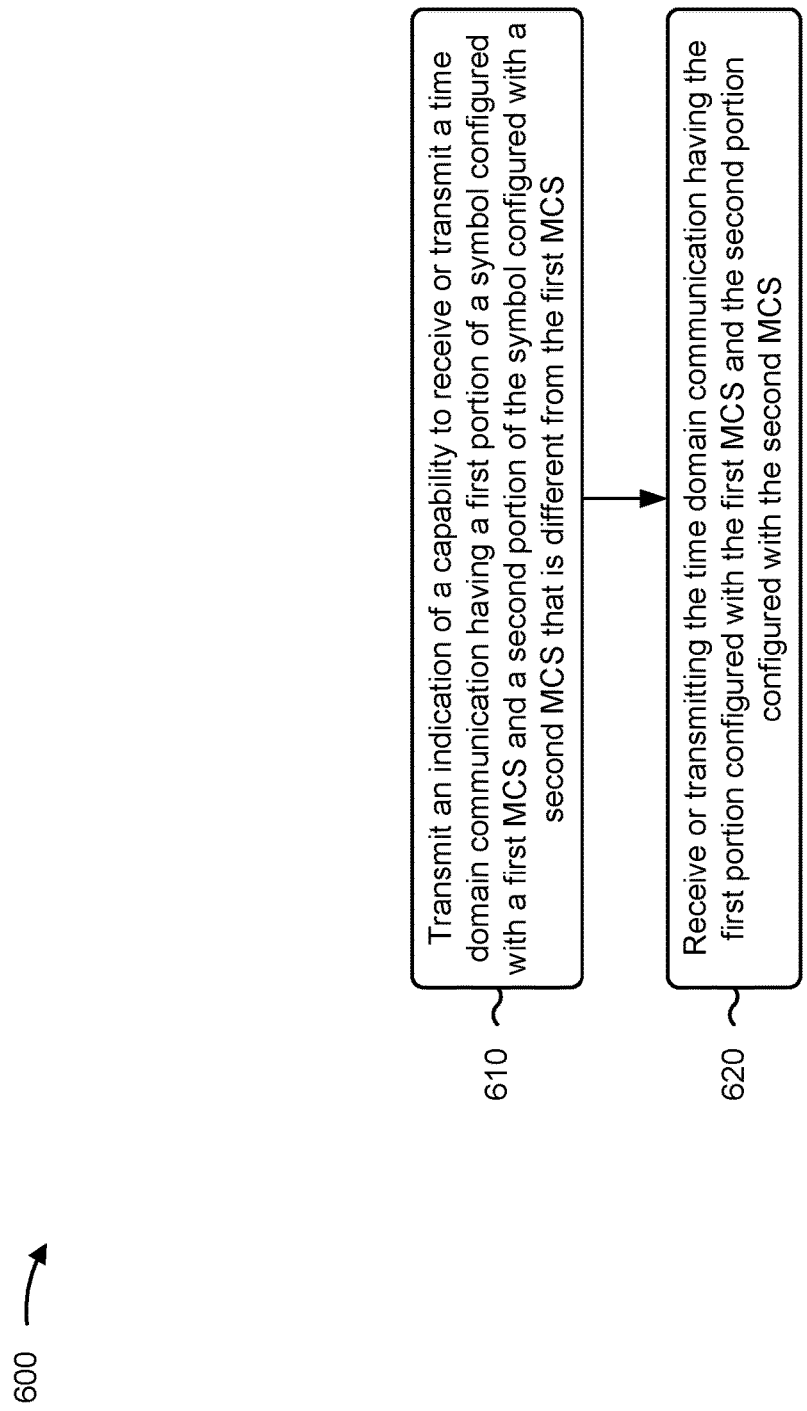
FIGS. 6 and 7 are diagrams illustrating example processes associated with time domain communications having multiple modulation and coding schemes, in accordance with the present disclosure.
Figure 7:
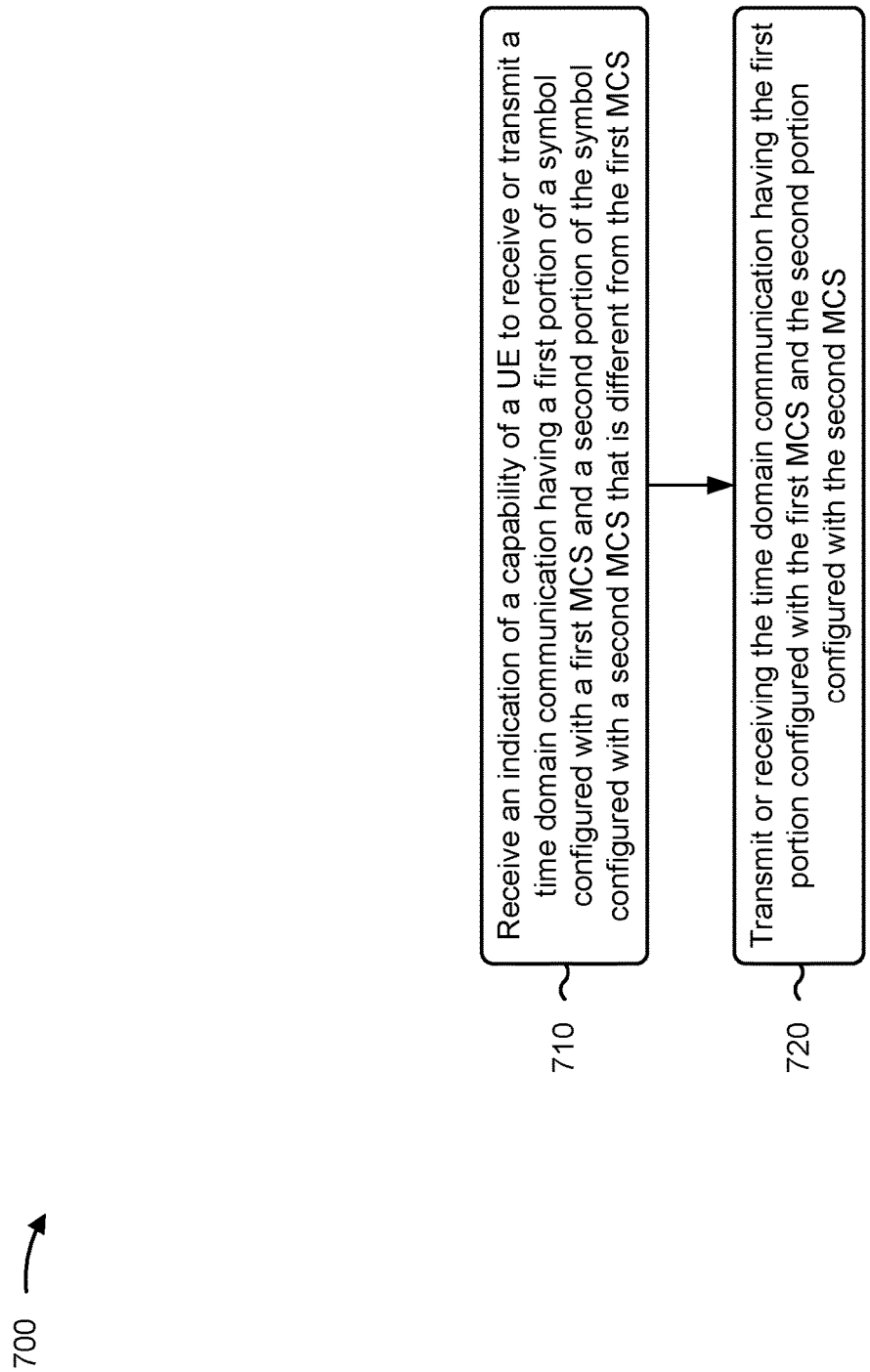

The controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE includes means for transmitting an indication of a capability to receive or transmit a time domain communication having a first portion of a symbol configured with a first MCS and a second portion of the symbol configured with a second MCS that is different from the first MCS; and/or means for receiving or transmitting the time domain communication having the first portion configured with the first MCS and the second portion configured with the second MCS. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for receiving an indication of a capability of a UE to receive or transmit a time domain communication having a first portion of a symbol configured with a first MCS and a second portion of the symbol configured with a second MCS that is different from the first MCS; and/or means for transmitting or receiving the time domain communication having the first portion configured with the first MCS and the second portion configured with the second MCS. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
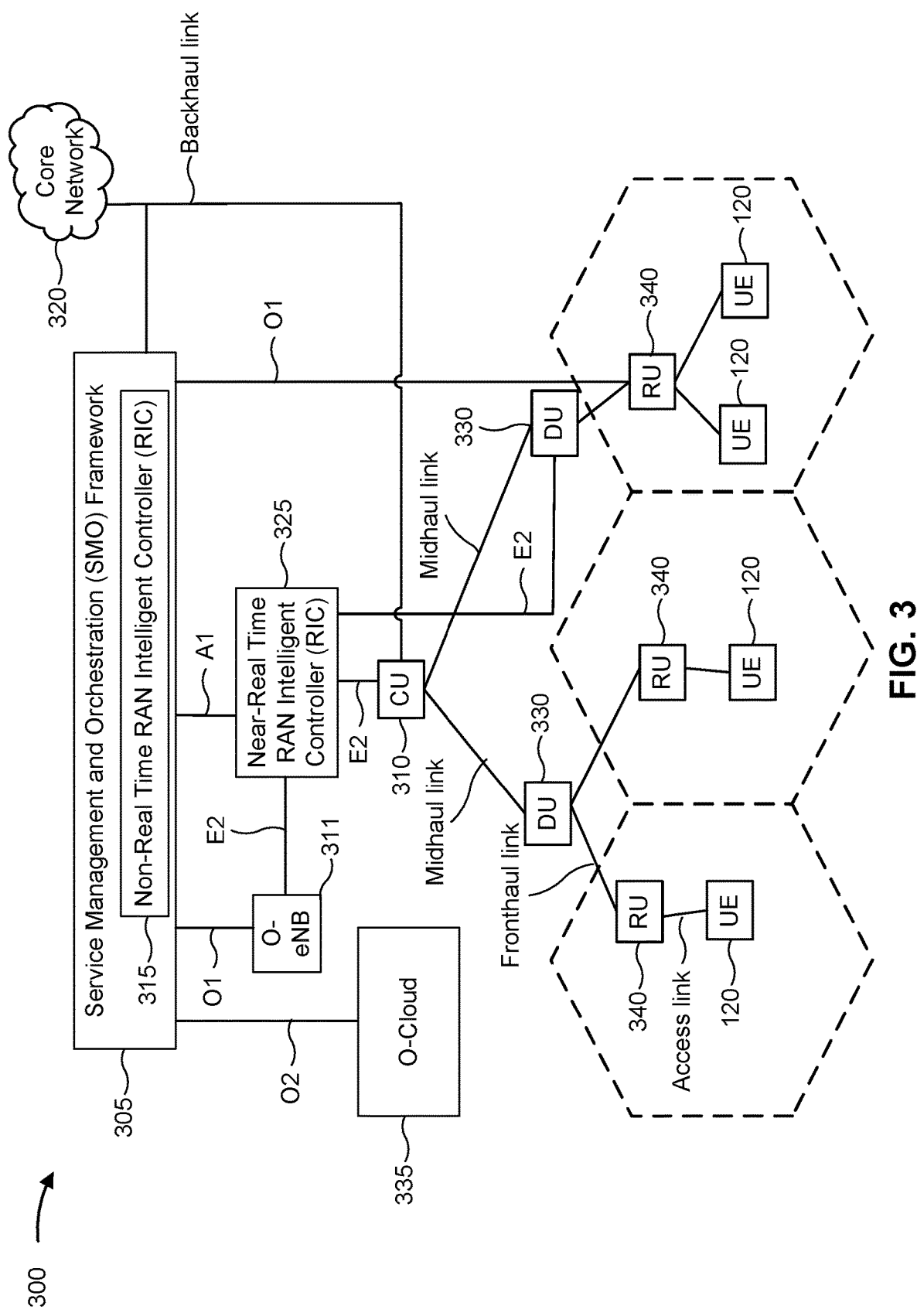
FIG. 3 is a diagram illustrating an example disaggregated base station architecture, in accordance with the present disclosure.

FIG. 3 is a diagram illustrating an example 300 disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 335) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT MC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via 01) or via creation of RAN management policies (such as A1 policies).

As indicated above, FIG. 3 is provided as an example. Other examples may differ from what is described with regard to FIG. 3.

Figure 4:
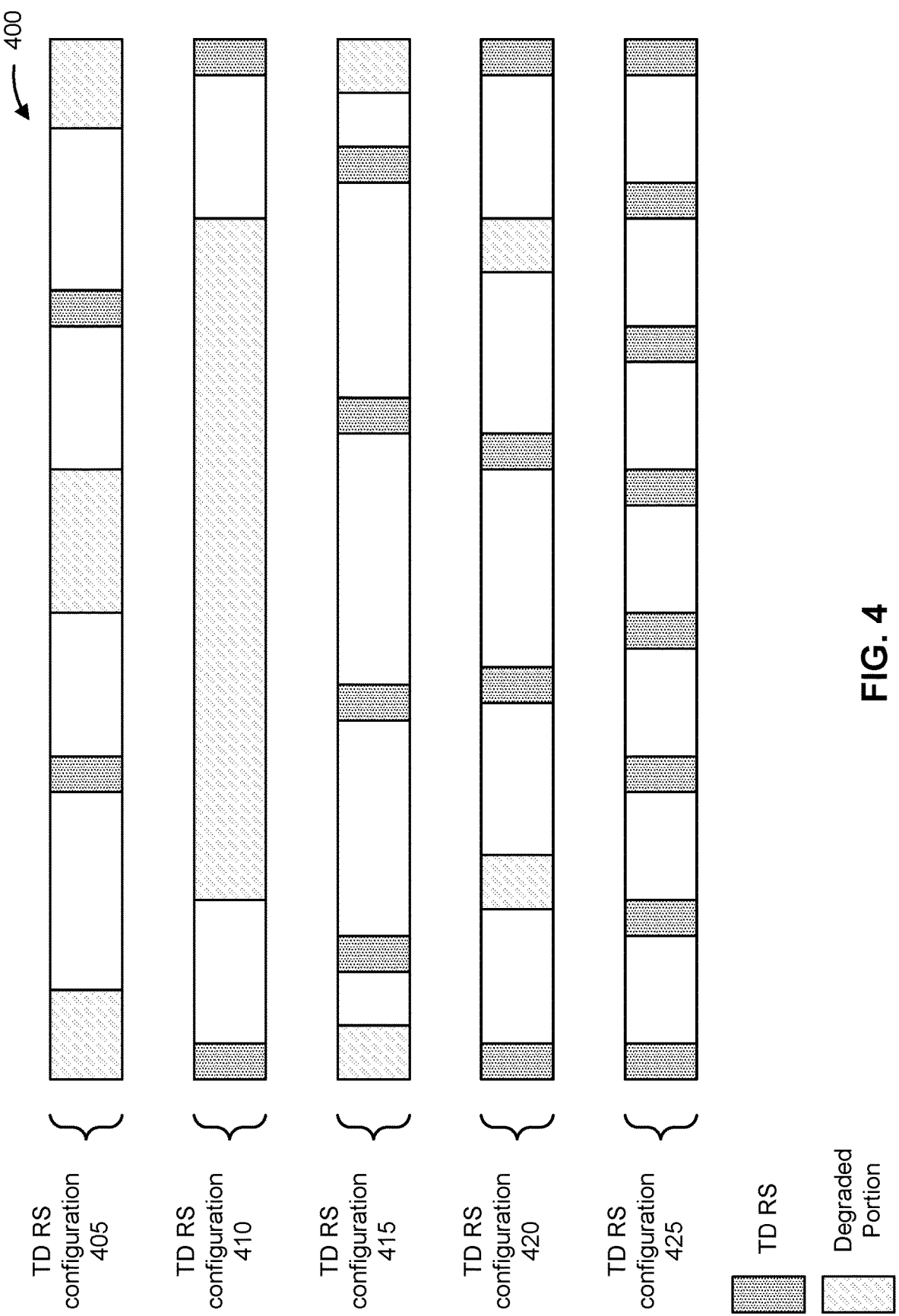
FIG. 4 is a diagram illustrating an example associated with time domain reference signals, in accordance with the present disclosure.

FIG. 4 is a diagram illustrating an example 400 associated with time domain reference signals, in accordance with the present disclosure. As shown in FIG. 4, a transmitting device (e.g., a network node or a UE) may transmit a time domain communication having the time domain reference signals distributed between data of the communication.

The transmitting device may use time domain communications to reduce power consumption of the transmitting device and/or the network node. For example, the transmitting device may use time domain communications to conserve power when communicating using a bandwidth size that satisfies a bandwidth size threshold, when communicating with a data rate that satisfies a data rate threshold, communicating using a particular communication protocol, and/or when communicating in a frequency band that satisfies a frequency threshold (e.g., FR4 or FR5, among other examples), among other examples. The time domain communications may use a time domain waveform instead of an OFDM waveform, which may have a higher throughput, greater channel robustness (e.g., with fading channel efficiency), and/or MIMO capabilities, among other examples.

In contrast, the time domain waveform may improve power consumption and low complexity phase noise mitigation relative to the OFDM waveform. A receiving device may use the time domain waveform to perform low complexity phase noise mitigation by using time domain reference signals within the time domain communication. For example, the time domain reference signals may include a time domain phase tracking reference signals (PTRSs) to compensate for an integrated phase noise (IPN) that increases with higher frequencies (e.g., in sub terahertz (SubTHz) bands).

DFT-s-OFDM waveforms provide a robust and reliable time domain waveform that mitigates both inter-symbol interference (ISI) by supporting frequency equalization and intercarrier interference (ICI) correction using time domain phase noise estimation. The DFT-s-OFDM waveform may be configured with symbols to carry the time domain reference signals at different locations of the time domain communication.

As shown in FIG. 4, the DFT-s-OFDM waveform may have time domain reference signals with different densities at the beginning and ending of a symbol, resulting in poor phase noise (PN) estimation near the symbol edges. In other examples, the DFT-s-OFDM may have large gaps between time domain reference signals (e.g., a gap that satisfies a timing threshold), which may result in poor PN estimation in a middle portion of the large gaps.

As shown by time domain reference signal (TD RS) configuration 405, the time domain communication may include two time domain reference signals, resulting in degraded portions at the beginning of the symbol, at the ending of the symbol, and at a portion that is in a middle of the two time domain reference signals. The degraded portions at the beginning of the symbol and at the ending of the symbol may be based at least in part on requiring extrapolation (e.g., in contrast to interpolation) using an estimated PN from the time domain reference signals. The degraded portion between the time domain reference signals may be based at least in part on being separated in time (e.g., by a threshold amount of time) from the time domain reference signals.

As shown by TD RS configuration 410, the time domain communication may include two time domain reference signals at ends of the symbol, resulting in a degraded portion in a middle of the two time domain reference signals. Additionally, or alternatively, based at least in part on the time domain reference signals being at the ends of the symbol, and based at least in part on time domain waveform processing including a backoff into a cyclic prefix of the symbol, the receiving device may not receive the time domain reference signals at the beginning or the end of the symbol.

As shown by TD RS configuration 415, the time domain communication may include four time domain reference signals, resulting in degraded portions at the beginning of the symbol and at the ending of the symbol.

As shown by TD RS configuration 420, the time domain communication may include four time domain reference signals including time domain reference signals at ends of the symbol, resulting in degraded portions between pairs of the time domain reference signals.

As shown by TD RS configuration 425, the time domain communication may include eight time domain reference signals including time domain reference signals at ends of the symbol, resulting in no degraded portions between pairs of the time domain reference signals or at ends of the symbol. Although the time domain reference signal configuration 425 reduces degradation within the symbol, a spectral efficiency is reduced based at least in part on overhead associated with the time domain communication including eight time domain reference signals (e.g., in place of data).

As indicated above, FIG. 4 is provided as an example. Other examples may differ from what is described with regard to FIG. 4.

As described in connection with FIG. 4, a time domain communication may include a configuration of time domain reference signals that can assist with PN estimation and correction that reduces degradation in the time domain communication. However, different configurations result in degradation at ends of a symbol and/or between time domain reference signals. The degradation may increase an error rate, which may cause a transmitting device and/or a receiving device to consume power, computing, communication, and/or network resources to detect and correct. Other configurations (e.g., having a relatively high number of time domain reference signals) may reduce degradation, but may also increase overhead (e.g., using network resources) and/or lead to an increased number of symbols needed to carry a same amount of information.

In some aspects described herein, a communication (e.g., a time domain communication) may include data samples having different MCSs. For example, the time domain communication may include adaptive MCSs for data samples located in different regions of a time domain symbol (e.g., a DFT-s-OFDM symbol) to optimize throughput based at least in part on phase noise and a PTRS allocation.

In some aspects, a UE may transmit (e.g., in a connection establishment process) an indication of a capability to demodulate and/or decode a symbol (e.g., a time domain symbol, such as a DFT-s-OFDM symbol) having multiple MCSs and/or constellations. In some aspects, a first portion of the symbol may have a first coding rate and/or modulation order constellation, and a second portion of the symbol may have a second coding rate and/or modulation order constellation. The first portion and the second portion may be based at least in part on likelihoods of PN estimation with accuracy that satisfies a threshold. For example, the first portion (e.g., one or more discontinuous portions of the symbol) may have a higher coding rate and/or modulation order based at least in part on being associated with a PN estimation with high accuracy (e.g., satisfying the threshold), and the second portion (e.g., one or more additional discontinuous portions of the symbol) may have a lower coding rate and/or modulation order based at least in part on being associated with a PN estimation with low accuracy (e.g., failing to satisfy the threshold). The likelihoods of PN estimation with accuracy that satisfies the threshold can be based at least in part on locations of the time domain reference signals, locations of data samples of the symbol, channel quality metrics, bandwidth size, bandwidth frequency location, a communication protocol, a backoff into a cyclic prefix, activation of a weighted overlap and add (WOLA) decoder, a channel delay spread, a phase noise mask, an integrated phase noise, and/or an MCS (e.g., data rate and/or modulation order constellation), among other examples.

Once connected, the UE and/or the network node may transmit an indication of a request to reduce and/or change an MCS, modulation order and/or data rate constellation associated with one or more samples and/or symbols of a communication (e.g., the time domain communication). The indication may indicate a requested MCS and/or a difference from an existing channel MCS (e.g., a physical downlink shared channel (PDSCH) MCS). For example, the indication may request to reduce MCS by a number of candidate MCS levels and/or to reduce a number of constellation points by one more candidate constellation levels for a second portion of a symbol and/or time domain communication. In some examples, the indication may request to use 16 quadrature amplitude modulation (QAM) for a first portion of a symbol (e.g., a symbol of a PDSCH) and quadrature phase shift keying (QPSK) for the second portion.

In some aspects, the UE or the network node may transmit the indication of the request in via one or more MAC control elements (CEs) and/or via RRC messages in a periodic or aperiodic manner.

Based at least in part on using a lower coding rate constellation for the second portion (e.g., based at least in part on the indication of the request) a same coding rate will be used for all code blocks, which may change a number of samples per code block for the second portion. For example, the second portion may include code blocks with a first number of samples, with the first number of samples being greater than a first number of samples used for code blocks of the first portion (e.g., based at least in part on samples of the second portion carrying a lower number of bits than samples of the first portion). Using a constellation with fewer constellation points may not require updating a transfer block number nor procedure but only change the number of bits it will include or the rate matching procedure.

Based at least in part on using a lower MCS for the second portion (e.g., based at least in part on the indication of the request), a different coding rate may be used, and two transfer blocks may be used on the symbol and/or time domain communication. Based at least in part on using the lower MCS for the second portion, segmentation and/or coding and rate matching of each transfer block may be performed separately. Additionally, or alternatively, each transport block may be mapped to dedicated symbols.

In some aspects, code blocks and/or transport blocks may be interleaved into the first portion and the second portion, such that multiple code blocks and/or transport blocks occupy different time resources with different likelihoods of distortion. In this way, a receiving device may have an improved likelihood of decoding and/or demodulating the code blocks and/or transport blocks based at least in part on occupation of time resources with PN estimation that satisfies a threshold (e.g., in the first portion of the symbol).

In some aspects, the transmitting device (e.g., requesting device) may be a UE, and the receiving device may be a network node. Additionally, or alternatively, the receiving device may be a UE, and the transmitting device may be a network node.

Based at least in part on the first portion having a first MCS, coding rate constellation, and/or modulation order and the second portion having a second MCS, coding rate constellation and/or modulation order, the first portion may be optimized for portions of a time domain communication having relatively accurate PN estimation, and the second portion may be optimized for portions of the time domain communication having relatively inaccurate PN estimation. For example, the first portion does not need to be configured with a relatively low and inefficient MCS to avoid errors in the second portion. Additionally, or alternatively, the second portion does not need to be configured with a relatively high MCS with a high error rate to allow for efficient use of the first portion. In this way, the first portion of the time domain communication may have an improved efficiency in carrying data, and the second portion may have a reduce error rate, which may conserve power, computing, network, and/or communication resources to detect and correct.

Figure 5:
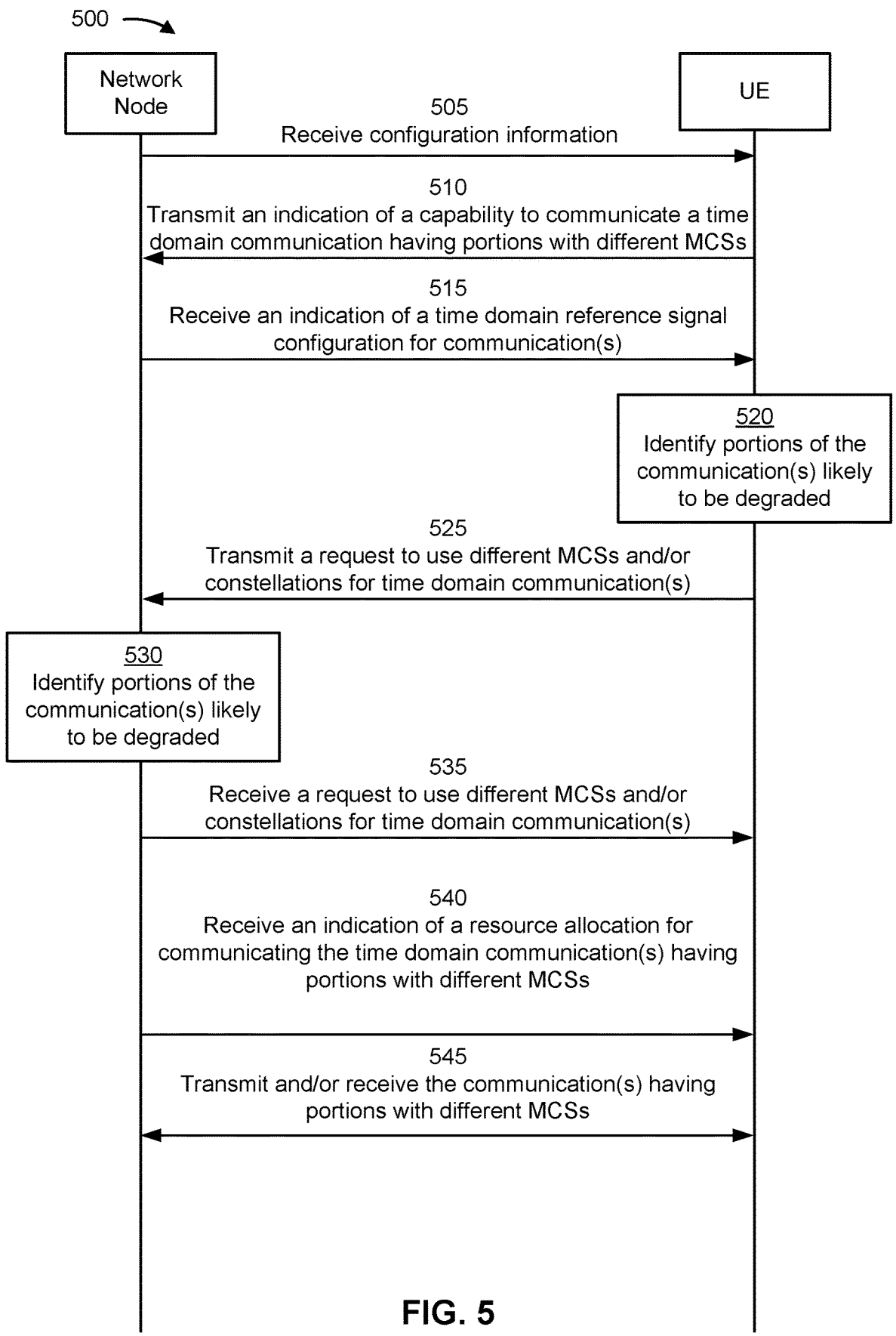
FIG. 5 is a diagram illustrating an example associated with time domain communications having multiple modulation and coding schemes, in accordance with the present disclosure.

FIG. 5 is a diagram of an example 500 associated with time domain communications having multiple MCSs, in accordance with the present disclosure. As shown in FIG. 5, a network node (e.g., base station 110, a CU, a DU, and/or an RU) may communicate with a UE (e.g., UE 120). In some aspects, the network node and the UE may be part of a wireless network (e.g., wireless network 100). The UE and the network node may have established a wireless connection prior to operations shown in FIG. 5. The multiple MCSs may differ in modulation orders and/or coding rate constellations, among other examples. In some aspects, a time domain communication may include a DFT-s-OFDM waveform and/or another type of time domain waveform. In some aspects, time domain reference signals may include time domain PTRSs.

As shown by reference number 505, the network node may transmit, and the UE may receive, configuration information. In some aspects, the UE may receive the configuration information via one or more of RRC signaling, one or more MAC CEs, and/or downlink control information (DCI), among other examples. In some aspects, the configuration information may include an indication of one or more configuration parameters (e.g., already known to the UE and/or previously indicated by the network node or other network device) for selection by the UE, and/or explicit configuration information for the UE to use to configure the UE, among other examples.

In some aspects, the configuration information may indicate that the UE is to transmit an indication of a capability to communicate with a time domain communication having portions with different MCSs. In some aspects, the configuration information may indicate contents of the indication of the capability. For example, the configuration information may indicate that the UE is to indicate support of one or more ways in which the MCSs may be different (e.g., different modulation orders and/or different coding rate constellations, among other examples) and/or by how much the MCSs may be different.

In some aspects, the configuration information may indicate that time domain communications having portions with different MCSs may be used for uplink communications and/or for downlink communications.

The UE may configure itself based at least in part on the configuration information. In some aspects, the UE may be configured to perform one or more operations described herein based at least in part on the configuration information.

As shown by reference number 510, the UE may transmit, and the network node may receive, an indication of a capability to communicate a time domain communication having portions with different MCSs. For example, the UE may transmit an indication of a capability to receive or transmit a time domain communication having a first portion of a symbol configured with a first MCS and a second portion of the symbol configured with a second MCS that is different from the first MCS.

In some aspects, the UE may indicate a capability to communicate with MCSs that differ in coding rate constellation and/or modulation orders. Additionally, or alternatively, the UE may indicate a capability to communicate with MCSs that differ by a threshold amount (e.g., less than, or no more than, the threshold amount) and/or whether the UE has a capability to communicate a downlink and/or uplink time domain communications having MCSs that differ.

As shown by reference number 515, the UE may receive, and the network node may transmit, an indication of a time domain reference signal configuration for one or more communications (e.g., one or more time domain communications). The time domain reference signal configuration may indicate a number of time domain reference signals per symbol and/or locations of the time domain reference signals within symbols of the one or more communications.

As shown by reference number 520, the UE may identify portions of the one or more communications likely to be degraded. In some aspects, the portions may include one or more samples of one or more symbols of the one or more communications. For example, the UE may identify a set of samples of each symbol of the one or more communications that are likely to have degradation (e.g., based at least in part on poor PN estimation). In some aspects, the UE may identify the portions of uplink communications and/or downlink communications that are likely to have degradation. In some aspects, the UE may identify the portions after receiving a downlink communication and observing degradation and/or poor PN estimation at the portions. In some aspects, the UE may identify the portions after receiving feedback on an uplink communication and observing high error rates in the portions.

The UE may identify one or more discontinuous portions of symbols of the one or more communications that are unlikely to be degraded (e.g., a first portion of symbols) and one or more discontinuous portions of symbols of the one or more communications that are likely to be degraded (e.g., a second portion of symbols) relative to the first portion.

The UE may identify the portions of the one or more communications likely to be degraded based at least in part on the time domain reference signal configuration and/or an amount of phase noise. For example, a first portion of a symbol may include and/or be associated with an amount of phase noise that satisfies a phase noise threshold and/or a reference signal allocation that satisfies a reference signal threshold. A second portion of the symbol may include and/or be associated with an amount of phase noise that fails to satisfy the phase noise threshold and/or a reference signal allocation that fails to satisfy the reference signal threshold.

For example, the second portion of symbols may include portions at a beginning of time domain symbols and at an ending of symbols based at least in part on requiring extrapolation (e.g., in contrast to interpolation) for PN estimation and/or may include portions in middle portions of time domain symbols may be based at least in part on being separated in time (e.g., by a threshold amount of time) from time domain reference signal, among other examples. Additionally, or alternatively, the UE may identify the portions of the one or more communications likely to be degraded based at least in part on locations of data samples of the symbols (e.g., relative to the time domain reference signals), channel quality metrics, bandwidth size, bandwidth frequency location, a communication protocol, a backoff into a cyclic prefix, activation of a WOLA decoder, a channel delay spread, and/or an MCS (e.g., data rate and/or modulation order constellation) of the one or more communications, among other examples.

As shown by reference number 525, the UE may transmit, and the network node may receive a request to use different MCSs and/or constellations (e.g., coding rate constellations) for one or more time domain communications. For example, the UE may transmit a request to use different MCSs for the first portion of a symbol and the second portion of the symbol. In some aspects, the request may indicate to use a first MCS for a first portion based at least in part on the amount of phase noise satisfying the phase noise threshold or a reference signal allocation satisfying the reference signal threshold (e.g., the reference signal allocation indicating that a time domain reference signal is within a threshold time of the first portion and/or that the first portion is between two time domain reference signals that can be uses for interpolation of PN at the first portion).

In some aspects, the request may indicate one or more parameters for using different MCSs for a same time domain communication and/or symbol of the time domain communication. For example, the request may include an indication of the first MCS and the second MCS, an indication of the first MCS and a difference requested for the second MCS, an indication of the second MCS and a difference requested for the first MCS, an indication of a difference requested for the second MCS from the first MCS as previously indicated or to be indicated after the request, and/or an indication of a difference requested for the first MCS from the second MCS as previously indicated or to be indicated after the request, among other examples.

In some aspects, the UE may transmit the request via a periodic MAC CE, an aperiodic MAC CE, a periodic RRC communication, and/or an aperiodic MAC CE, among other examples. The UE may transmit the request via an explicit indication within a single MAC CE or an RRC communication, or the UE may transmit the indication using multiple messages. For example, the UE may transmit an indication of a set of candidate indications via an RRC communication and may select a candidate indication from the set of candidate indications via a MAC CE.

As shown by reference number 530, the network node may identify portions of the one or more communications likely to be degraded. In some aspects, the network node may identify the portions independently from the UE identifying the portions. For example, the network node may identify the portions in the absence of, or before, the UE transmits the request described in connection with reference number 525 or another indication of the portions as identified by the UE. Alternatively, the network node may identify the portions based at least in part on receiving the request described in connection with reference number 525 or another indication of the portions as identified by the UE.

In some aspects, the portions may include one or more samples of one or more symbols of the one or more communications. For example, the network node may identify a set of samples of each symbol of the one or more communications that are likely to have degradation (e.g., based at least in part on poor PN estimation). In some aspects, the network node may identify the portions of uplink communications and/or downlink communications that are likely to have degradation. In some aspects, the network node may identify the portions after receiving an uplink communication and observing degradation and/or poor PN estimation at the portions. In some aspects, the network node may identify the portions after receiving feedback on a downlink communication and observing high error rates in the portions.

The network node may identify one or more discontinuous portions of symbols of the one or more communications that are unlikely to be degraded (e.g., a first portion of symbols) and one or more discontinuous portions of symbols of the one or more communications that are likely to be degraded (e.g., a second portion of symbols) relative to the first portion.

The network node may identify the portions of the one or more communications likely to be degraded based at least in part on the time domain reference signal configuration. For example, the second portion of symbols may include portions at a beginning of time domain symbols and at an ending of symbols based at least in part on requiring extrapolation (e.g., in contrast to interpolation) for PN estimation and/or may include portions in middle portions of time domain symbols may be based at least in part on being separated in time (e.g., by a threshold amount of time) from time domain reference signal, among other examples. Additionally, or alternatively, the UE may identify the portions of the one or more communications likely to be degraded based at least in part on locations of data samples of the symbols (e.g., relative to the time domain reference signals), channel quality metrics, bandwidth size, bandwidth frequency location, a communication protocol, a backoff into a cyclic prefix, activation of a WOLA decoder, a channel delay spread, and/or an MCS (e.g., data rate and/or modulation order constellation) of the one or more communications, among other examples.

As shown by reference number 535, the UE may receive, and the network node may transmit a request (e.g., an indication) to use different MCSs and/or constellations (e.g., coding rate constellations) for one or more time domain communications. For example, the network node may transmit a request to use different MCSs for the first portion of a symbol and the second portion of the symbol. In some aspects, the request may indicate to use a first MCS for a first portion based at least in part on the amount of phase noise satisfying the phase noise threshold or a reference signal allocation satisfying the reference signal threshold (e.g., the reference signal allocation indicating that a time domain reference signal is within a threshold time of the first portion and/or that the first portion is between two time domain reference signals that can be uses for interpolation of PN at the first portion).

In some aspects, the request may indicate one or more parameters for using different MCSs for a same time domain communication and/or symbol of the time domain communication. For example, the request may include an indication of the first MCS and the second MCS, an indication of the first MCS and a difference requested for the second MCS, an indication of the second MCS and a difference requested for the first MCS, an indication of a difference requested for the second MCS from the first MCS as previously indicated or to be indicated after the request, and/or an indication of a difference requested for the first MCS from the second MCS as previously indicated or to be indicated after the request, among other examples.

In some aspects, the network node may transmit the request via a periodic MAC CE, an aperiodic MAC CE, a periodic RRC communication, and/or an aperiodic MAC CE, among other examples. The network node may transmit the request via an explicit indication within a single MAC CE or an RRC communication, or the network node may transmit the indication using multiple messages. For example, the network node may transmit an indication of a set of candidate indications via an RRC communication and may select a candidate indication from the set of candidate indications via a MAC CE.

As shown by reference number 540, the UE may receive, and the network node may transmit, an indication of a resource allocation for communicating the one or more time domain communications having portions with different MCSs. In some aspects, the resource allocation may indicate that the one or more time domain communications are to have first portions configured with the first MCS and second portions configured with the second MCS. In some aspects, the first MCS has a first coding rate and a first modulation order constellation, and the second MCS has a second coding rate and a second modulation order constellation. The first coding rate may be different from the second coding rate, or the first modulation order constellation may be different from the second modulation order constellation based at least in part on the request to use the different MCSs and/or constellations as described in connection with reference number 525. Additionally, or alternatively, the first coding rate may be different from the second coding rate, or the first modulation order constellation may be different from the second modulation order constellation based at least in part on the network node identifying the portions of the one or more communications likely to be degraded as described in connection with reference number 530, among other examples.

In some aspects, the first modulation order constellation is different from the second modulation order constellation, and the first portion and the second portion are configured with a same coding rate. In some aspects, the first portion and the second portion are portions of a same transfer block. In some aspects, the first portion has a first number of samples per code block and the second portion has a second number of samples per code block that is different from the first number of bits per code block, and/or the time domain communication uses rate matching based at least in part on the second number of samples per code block being different from the first number of samples per code block. In some aspects, the first coding rate is different from the second coding rate, the first portion is associated with a first transfer block, and the second portion is associated with a second transfer block.

As shown by reference number 545, the UE and the network node may transmit and/or receive the one or more communications having portions with different MCSs. For example, the UE may receive or transmit a time domain communication having the first portion configured with the first MCS and the second portion configured with the second MCS. In some aspects, the UE and the network node may communicate downlink communications with different MCSs and/or uplink communications with different MCSs.

In some aspects, the one or more communications may use a first MCS for a first portion based at least in part on the amount of phase noise satisfying the phase noise threshold or a reference signal allocation satisfying the reference signal threshold (e.g., the reference signal allocation indicating that a time domain reference signal is within a threshold time of the first portion and/or that the first portion is between two time domain reference signals that can be uses for interpolation of PN at the first portion).

Based at least in part on the first portion having a first MCS, coding rate constellation, and/or modulation order and the second portion having a second MCS, coding rate constellation and/or modulation order, the first portion may be optimized for portions of a time domain communication having relatively accurate PN estimation, and the second portion may be optimized for portions of the time domain communication having relatively inaccurate PN estimation. For example, the first portion does not need to be configured with a relatively low and inefficient MCS to avoid errors in the second portion. Additionally, or alternatively, the second portion does not need to be configured with a relatively high MCS with a high error rate to allow for efficient use of the first portion. In this way, the first portion of the time domain communication may have an improved efficiency in carrying data, and the second portion may have a reduced error rate, which may conserve power, computing, network, and/or communication resources to detect and correct.

As indicated above, FIG. 5 is provided as an example. Other examples may differ from what is described with respect to FIG. 5.

FIG. 6 is a diagram illustrating an example process 600 performed, for example, by a UE, in accordance with the present disclosure. Example process 600 is an example where the UE (e.g., UE 120) performs operations associated with time domain communications having multiple MCSs.

As shown in FIG. 6, in some aspects, process 600 may include transmitting an indication of a capability to receive or transmit a time domain communication having a first portion of a symbol configured with a first MCS and a second portion of the symbol configured with a second MCS that is different from the first MCS (block 610). For example, the UE (e.g., using communication manager 140 and/or transmission component 804, depicted in FIG. 8) may transmit an indication of a capability to receive or transmit a time domain communication having a first portion of a symbol configured with a first MCS and a second portion of the symbol configured with a second MCS that is different from the first MCS, as described above.

As further shown in FIG. 6, in some aspects, process 600 may include receiving or transmitting the time domain communication having the first portion configured with the first MCS and the second portion configured with the second MCS (block 620). For example, the UE (e.g., using communication manager 140 and/or reception component 802, depicted in FIG. 8) may receive or transmitting the time domain communication having the first portion configured with the first MCS and the second portion configured with the second MCS, as described above.

Process 600 may include additional aspects, such as any single aspect or any combination of aspects described below and/or in connection with one or more other processes described elsewhere herein.

In a first aspect, the time domain communication comprises one or more of a discrete DFT-s-OFDM waveform, or a time domain waveform.

In a second aspect, alone or in combination with the first aspect, the time domain communication comprises one or more TD-PTRSs on one or more samples of the time domain communication.

In a third aspect, alone or in combination with one or more of the first and second aspects, the first portion of the symbol comprises one or more of an amount of phase noise that satisfies a phase noise threshold, or a reference signal allocation that satisfies a reference signal threshold.

In a fourth aspect, alone or in combination with one or more of the first through third aspects, the first portion of the symbol is configured with the first MCS based at least in part on one or more of the amount of phase noise satisfying the phase noise threshold or the reference signal allocation satisfying the reference signal threshold.

In a fifth aspect, alone or in combination with one or more of the first through fourth aspects, process 600 includes receiving an indication of a resource allocation for transmitting or receiving the time domain communication, wherein the resource allocation indicates that the time domain communication is to have the first portion configured with the first MCS and the second portion configured with the second MCS.

In a sixth aspect, alone or in combination with one or more of the first through fifth aspects, the first MCS has a first coding rate and a first modulation order constellation, wherein the second MCS has a second coding rate and a second modulation order constellation, and wherein the first coding rate is different from the second coding rate or the first modulation order constellation is different from the second modulation order constellation.

In a seventh aspect, alone or in combination with one or more of the first through sixth aspects, the first modulation order constellation is different from the second modulation order constellation, wherein the first portion and the second portion are configured with a same coding rate, wherein the first portion and the second portion are portions of a same transfer block, wherein the first portion has a first number of samples per code block, wherein the second portion has a second number of samples per code block that is different from the first number of bits per code block, and wherein the time domain communication uses rate matching based at least in part on the second number of samples per code block being different from the first number of samples per code block.

In an eighth aspect, alone or in combination with one or more of the first through seventh aspects, the first coding rate is different from the second coding rate, and wherein the first portion is associated with a first transfer block and the second portion is associated with a second transfer block.

In a ninth aspect, alone or in combination with one or more of the first through eighth aspects, process 600 includes transmitting or receiving a request to use different MCSs for the first portion and the second portion.

In a tenth aspect, alone or in combination with one or more of the first through ninth aspects, the request indicates one or more of an indication of the first MCS and the second MCS, an indication of the first MCS and a difference requested for the second MCS, an indication of the second MCS and a difference requested for the first MCS, an indication of a difference requested for the second MCS from the first MCS as previously indicated or to be indicated after the request, or an indication of a difference requested for the first MCS from the second MCS as previously indicated or to be indicated after the request.

In an eleventh aspect, alone or in combination with one or more of the first through tenth aspects, transmitting or receiving the request comprises transmitting or receiving the request via one or more of a periodic MAC CE, an aperiodic MAC CE, a periodic RRC communication, or an aperiodic RRC communication.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a network node, in accordance with the present disclosure. Example process 700 is an example where the network node (e.g., base station 110, a component of base station 110, a CU, a DU, and/or an RU, among other examples) performs operations associated with time domain communications having multiple MCSs.

As shown in FIG. 7, in some aspects, process 700 may include receiving an indication of a capability of a UE to receive or transmit a time domain communication having a first portion of a symbol configured with a first MCS and a second portion of the symbol configured with a second MCS that is different from the first MCS (block 710). For example, the network node (e.g., using communication manager 150 and/or reception component 902, depicted in FIG. 9) may receive an indication of a capability of a UE to receive or transmit a time domain communication having a first portion of a symbol configured with a first MCS and a second portion of the symbol configured with a second MCS that is different from the first MCS, as described above.

As further shown in FIG. 7, in some aspects, process 700 may include transmitting or receiving the time domain communication having the first portion configured with the first MCS and the second portion configured with the second MCS (block 720). For example, the network node (e.g., using communication manager 150 and/or transmission component 904, depicted in FIG. 9) may transmit or receiving the time domain communication having the first portion configured with the first MCS and the second portion configured with the second MCS, as described above.

Process 700 may include additional aspects, such as any single aspect or any combination of aspects described below and/or in connection with one or more other processes described elsewhere herein.

In a first aspect, the time domain communication comprises one or more of a discrete Fourier transform spread orthogonal frequency division multiplexing (DFT-s-OFDM) waveform, or a time domain waveform.

In a second aspect, alone or in combination with the first aspect, the time domain communication comprises one or more time domain phase tracking reference signals (TD-PTRSs) on one or more samples of the time domain communication.

In a third aspect, alone or in combination with one or more of the first and second aspects, the first portion of the symbol comprises one or more of an amount of phase noise that satisfies a phase noise threshold, or a reference signal allocation that satisfies a reference signal threshold.

In a fourth aspect, alone or in combination with one or more of the first through third aspects, the first portion of the symbol is configured with the first MCS based at least in part on one or more of the amount of phase noise satisfying the phase noise threshold or the reference signal allocation satisfying the reference signal threshold.

In a fifth aspect, alone or in combination with one or more of the first through fourth aspects, process 700 includes transmitting an indication of a resource allocation for transmitting or receiving the time domain communication, wherein the resource allocation indicates that the time domain communication is to have the first portion configured with the first MCS and the second portion configured with the second MCS.

In a sixth aspect, alone or in combination with one or more of the first through fifth aspects, the first MCS has a first coding rate and a first modulation order constellation, wherein the second MCS has a second coding rate and a second modulation order constellation, and wherein the first coding rate is different from the second coding rate or the first modulation order constellation is different from the second modulation order constellation.

In a seventh aspect, alone or in combination with one or more of the first through sixth aspects, the first modulation order constellation is different from the second modulation order constellation, wherein the first portion and the second portion are configured with a same coding rate, wherein the first portion and the second portion are portions of a same transfer block, wherein the first portion has a first number of samples per code block, wherein the second portion has a second number of samples per code block that is different from the first number of bits per code block, and wherein the time domain communication uses rate matching based at least in part on the second number of samples per code block being different from the first number of samples per code block.

In an eighth aspect, alone or in combination with one or more of the first through seventh aspects, the first coding rate is different from the second coding rate, and wherein the first portion is associated with a first transfer block and the second portion is associated with a second transfer block.

In a ninth aspect, alone or in combination with one or more of the first through eighth aspects, process 700 includes transmitting or receiving a request to use different MCSs for the first portion and the second portion.

In a tenth aspect, alone or in combination with one or more of the first through ninth aspects, the request indicates one or more of an indication of the first MCS and the second MCS, an indication of the first MCS and a difference requested for the second MCS, an indication of the second MCS and a difference requested for the first MCS, an indication of a difference requested for the second MCS from the first MCS as previously indicated or to be indicated after the request, or an indication of a difference requested for the first MCS from the second MCS as previously indicated or to be indicated after the request.

In an eleventh aspect, alone or in combination with one or more of the first through tenth aspects, transmitting or receiving the request comprises transmitting or receiving the request via one or more of a periodic MAC CE, an aperiodic MAC CE, a periodic RRC communication, or an aperiodic RRC communication.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
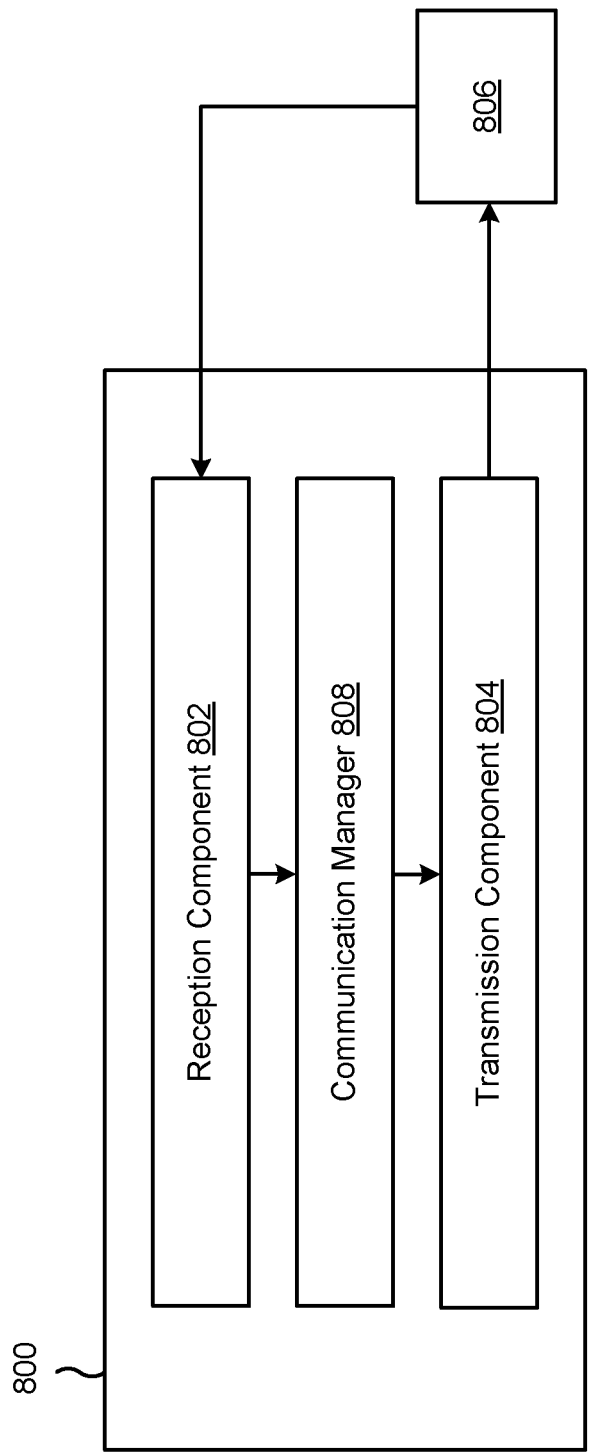
FIGS. 8 and 9 are diagrams of example apparatuses for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a communication manager 808 (e.g., the communication manager 140).

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The transmission component 804 may transmit an indication of a capability to receive or transmit a time domain communication having a first portion of a symbol configured with a first MCS and a second portion of the symbol configured with a second MCS that is different from the first MCS. The reception component 802 may receive or transmitting the time domain communication having the first portion configured with the first MCS and the second portion configured with the second MCS.

The reception component 802 may receive an indication of a resource allocation for transmitting or receiving the time domain communication wherein the resource allocation indicates that the time domain communication is to have the first portion configured with the first MCS and the second portion configured with the second MCS.

The transmission component 804 may transmit or receiving a request to use different MCSs for the first portion and the second portion.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
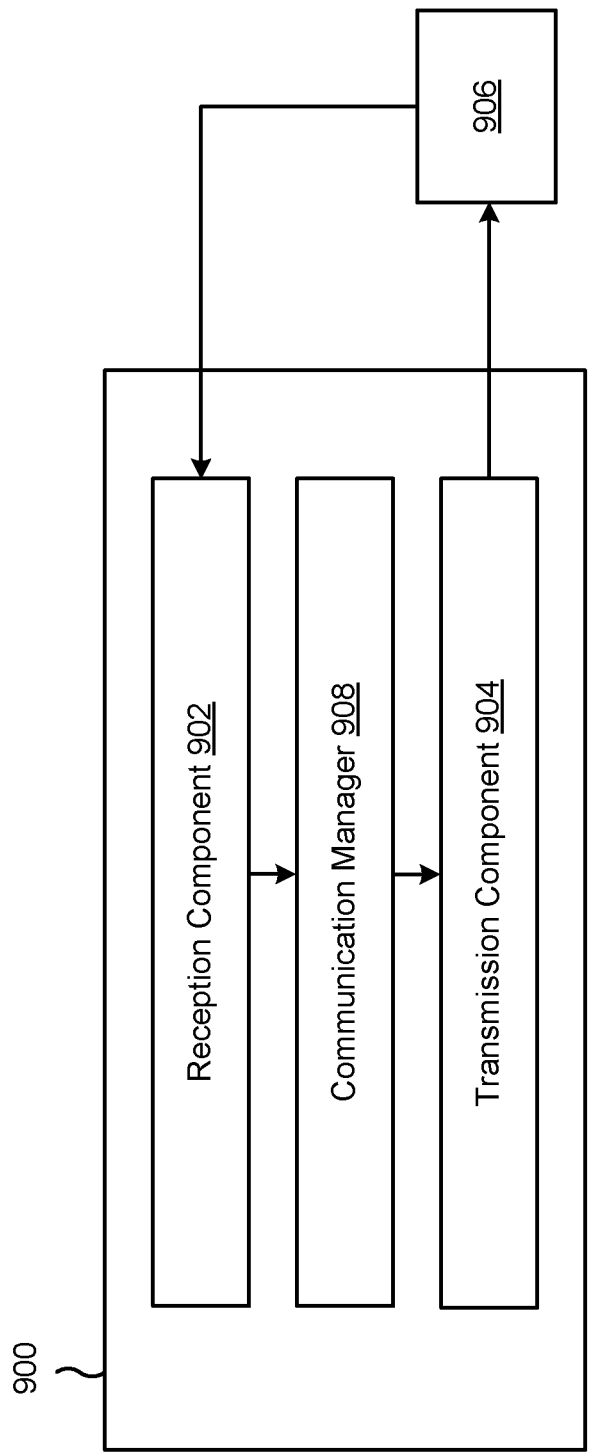

FIG. 9 is a diagram of an example apparatus 900 for wireless communication. The apparatus 900 may be a network node, or a network node may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a communication manager 908 (e.g., the communication manager 150).

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network node described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the network node described in connection with FIG. 2. In some aspects, the transmission component 904 may be co-located with the reception component 902 in a transceiver.

The reception component 902 may receive an indication of a capability of a UE to receive or transmit a time domain communication having a first portion of a symbol configured with a first MCS and a second portion of the symbol configured with a second MCS that is different from the first MCS. The transmission component 904 may transmit or receiving the time domain communication having the first portion configured with the first MCS and the second portion configured with the second MCS.

The transmission component 904 may transmit an indication of a resource allocation for transmitting or receiving the time domain communication wherein the resource allocation indicates that the time domain communication is to have the first portion configured with the first MCS and the second portion configured with the second MCS.

The transmission component 904 may transmit or receiving a request to use different MCSs for the first portion and the second portion.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: transmitting an indication of a capability to receive or transmit a time domain communication having a first portion of a symbol configured with a first modulation and coding scheme (MCS) and a second portion of the symbol configured with a second MCS that is different from the first MCS; and receiving or transmitting the time domain communication having the first portion configured with the first MCS and the second portion configured with the second MCS.

Aspect 2: The method of Aspect 1, wherein the time domain communication comprises one or more of: a discrete Fourier transform spread orthogonal frequency division multiplexing (DFT-s-OFDM) waveform, or a time domain waveform.

Aspect 3: The method of any of Aspects 1 or 2, wherein the time domain communication comprises: one or more time domain phase tracking reference signals (TD-PTRSs) on one or more samples of the time domain communication.

Aspect 4: The method of any of Aspects 1-3, wherein the first portion of the symbol comprises one or more of: an amount of phase noise that satisfies a phase noise threshold, or a reference signal allocation that satisfies a reference signal threshold.

Aspect 5: The method of Aspect 4, wherein the first portion of the symbol is configured with the first MCS based at least in part on one or more of the amount of phase noise satisfying the phase noise threshold or the reference signal allocation satisfying the reference signal threshold.

Aspect 6: The method of any of Aspects 1-5, further comprising: receiving an indication of a resource allocation for transmitting or receiving the time domain communication, wherein the resource allocation indicates that the time domain communication is to have the first portion configured with the first MCS and the second portion configured with the second MCS.

Aspect 7: The method of any of Aspects 1-6, wherein the first MCS has a first coding rate and a first modulation order constellation, wherein the second MCS has a second coding rate and a second modulation order constellation, and wherein the first coding rate is different from the second coding rate or the first modulation order constellation is different from the second modulation order constellation.

Aspect 8: The method of Aspect 7, wherein the first modulation order constellation is different from the second modulation order constellation, wherein the first portion and the second portion are configured with a same coding rate, wherein the first portion and the second portion are portions of a same transfer block, wherein the first portion has a first number of samples per code block, wherein the second portion has a second number of samples per code block that is different from the first number of bits per code block, and wherein the time domain communication uses rate matching based at least in part on the second number of samples per code block being different from the first number of samples per code block.

Aspect 9: The method of Aspect 7, wherein the first coding rate is different from the second coding rate, and wherein the first portion is associated with a first transfer block and the second portion is associated with a second transfer block.

Aspect 10: The method of any of Aspects 1-9, further comprising: transmitting or receiving a request to use different MCSs for the first portion and the second portion.

Aspect 11: The method of Aspect 10, wherein the request indicates one or more of: an indication of the first MCS and the second MCS, an indication of the first MCS and a difference requested for the second MCS, an indication of the second MCS and a difference requested for the first MCS, an indication of a difference requested for the second MCS from the first MCS as previously indicated or to be indicated after the request, or an indication of a difference requested for the first MCS from the second MCS as previously indicated or to be indicated after the request.

Aspect 12: The method of Aspect 10, wherein transmitting or receiving the request comprises transmitting or receiving the request via one or more of: a periodic medium access control (MAC) control element (CE), an aperiodic MAC CE, a periodic radio resource control (RRC) communication, or an aperiodic RRC communication.

Aspect 13: A method of wireless communication performed by a network node, comprising: receiving an indication of a capability of a user equipment (UE) to receive or transmit a time domain communication having a first portion of a symbol configured with a first modulation and coding scheme (MCS) and a second portion of the symbol configured with a second MCS that is different from the first MCS; and transmitting or receiving the time domain communication having the first portion configured with the first MCS and the second portion configured with the second MCS.

Aspect 14: The method of Aspect 13, wherein the time domain communication comprises one or more of: a discrete Fourier transform spread orthogonal frequency division multiplexing (DFT-s-OFDM) waveform, or a time domain waveform.

Aspect 15: The method of any of Aspects 13 or 14, wherein the time domain communication comprises: one or more time domain phase tracking reference signals (TD-PTRSs) on one or more samples of the time domain communication.

Aspect 16: The method of any of Aspects 13-15, wherein the first portion of the symbol comprises one or more of: an amount of phase noise that satisfies a phase noise threshold, or a reference signal allocation that satisfies a reference signal threshold.

Aspect 17: The method of Aspect 16, wherein the first portion of the symbol is configured with the first MCS based at least in part on one or more of the amount of phase noise satisfying the phase noise threshold or the reference signal allocation satisfying the reference signal threshold.

Aspect 18: The method of any of Aspects 13-17, further comprising: transmitting an indication of a resource allocation for transmitting or receiving the time domain communication, wherein the resource allocation indicates that the time domain communication is to have the first portion configured with the first MCS and the second portion configured with the second MCS.

Aspect 19: The method of any of Aspects 13-18, wherein the first MCS has a first coding rate and a first modulation order constellation, wherein the second MCS has a second coding rate and a second modulation order constellation, and wherein the first coding rate is different from the second coding rate or the first modulation order constellation is different from the second modulation order constellation.

Aspect 20: The method of Aspect 19, wherein the first modulation order constellation is different from the second modulation order constellation, wherein the first portion and the second portion are configured with a same coding rate, wherein the first portion and the second portion are portions of a same transfer block, wherein the first portion has a first number of samples per code block, wherein the second portion has a second number of samples per code block that is different from the first number of bits per code block, and wherein the time domain communication uses rate matching based at least in part on the second number of samples per code block being different from the first number of samples per code block.

Aspect 21: The method of Aspect 19, wherein the first coding rate is different from the second coding rate, and wherein the first portion is associated with a first transfer block and the second portion is associated with a second transfer block.

Aspect 22: The method of any of Aspects 13-21, further comprising: transmitting or receiving a request to use different MCSs for the first portion and the second portion.

Aspect 23: The method of Aspect 22, wherein the request indicates one or more of: an indication of the first MCS and the second MCS, an indication of the first MCS and a difference requested for the second MCS, an indication of the second MCS and a difference requested for the first MCS, an indication of a difference requested for the second MCS from the first MCS as previously indicated or to be indicated after the request, or an indication of a difference requested for the first MCS from the second MCS as previously indicated or to be indicated after the request.

Aspect 24: The method of Aspect 22, wherein transmitting or receiving the request comprises transmitting or receiving the request via one or more of: a periodic medium access control (MAC) control element (CE), an aperiodic MAC CE, a periodic radio resource control (RRC) communication, or an aperiodic RRC communication.

Aspect 25: An apparatus for wireless communication at a device, comprising a processor; memory coupled with the processor; and instructions stored in the memory and executable by the processor to cause the apparatus to perform the method of one or more of Aspects 1-24.

Aspect 26: A device for wireless communication, comprising a memory and one or more processors coupled to the memory, the one or more processors configured to perform the method of one or more of Aspects 1-24.

Aspect 27: An apparatus for wireless communication, comprising at least one means for performing the method of one or more of Aspects 1-24.

Aspect 28: A non-transitory computer-readable medium storing code for wireless communication, the code comprising instructions executable by a processor to perform the method of one or more of Aspects 1-24.

Aspect 29: A non-transitory computer-readable medium storing a set of instructions for wireless communication, the set of instructions comprising one or more instructions that, when executed by one or more processors of a device, cause the device to perform the method of one or more of Aspects 1-24.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
   transmit an indication of a capability to receive or transmit a time domain communication having a first portion of a symbol configured with a first modulation and coding scheme (MCS) and a second portion of the symbol configured with a second MCS that is different from the first MCS, wherein the second portion of the symbol includes a first sub-portion at a beginning of the symbol and a second sub-portion at an end of the symbol based at least in part on the first sub-portion and the second sub-portion being associated with extrapolation for phase noise estimation, or wherein the second portion of the symbol comprises a center portion of the symbol based at least in part on the center portion of the symbol being separated by a threshold amount of time from a time domain reference signal; and
   receive or transmit the time domain communication having the first portion of the symbol configured with the first MCS and the second portion of the symbol configured with the second MCS.

2. The UE of claim 1, wherein the time domain communication comprises one or more of:
   a discrete Fourier transform spread orthogonal frequency division multiplexing (DFT-s-OFDM) waveform, or
   a time domain waveform.

3. The UE of claim 1, wherein the time domain communication comprises:
   one or more time domain phase tracking reference signals (TD-PTRSs) on one or more samples of the time domain communication.

4. The UE of claim 1, wherein the first portion of the symbol comprises one or more discontinuous portions of the symbol and one or more of:
   an amount of phase noise that satisfies a phase noise threshold, or
   a reference signal allocation that satisfies a reference signal threshold.

5. The UE of claim 4, wherein the first portion of the symbol is configured with the first MCS based at least in part on one or more of the amount of phase noise satisfying the phase noise threshold or the reference signal allocation satisfying the reference signal threshold.

6. The UE of claim 1, wherein the one or more processors are further configured to:
   receive an indication of a resource allocation for transmitting or receiving the time domain communication,
   wherein the resource allocation indicates that the time domain communication is to have the first portion of the symbol configured with the first MCS and the second portion of the symbol configured with the second MCS.

7. The UE of claim 1, wherein the first MCS has a first coding rate and a first modulation order constellation,
   wherein the second MCS has a second coding rate and a second modulation order constellation, and
   wherein the first coding rate is different from the second coding rate or the first modulation order constellation is different from the second modulation order constellation.

8. The UE of claim 7, wherein the first modulation order constellation is different from the second modulation order constellation,
   wherein the first portion of the symbol and the second portion of the symbol are configured with a same coding rate,
   wherein the first portion of the symbol and the second portion of the symbol are portions of a same transfer block,
      wherein the first portion of the symbol has a first number of samples per code block,
      wherein the second portion of the symbol has a second number of samples per code block that is different from the first number of bits per code block, and
      wherein the time domain communication uses rate matching based at least in part on the second number of samples per code block being different from the first number of samples per code block.

9. The UE of claim 7, wherein the first coding rate is different from the second coding rate, and
   wherein the first portion of the symbol is associated with a first transfer block and the second portion of the symbol is associated with a second transfer block.

10. The UE of claim 1, wherein the one or more processors are further configured to:
    transmit or receive a request to use different MCSs for the first portion of the symbol and the second portion of the symbol.

11. The UE of claim 10, wherein the request indicates one or more of:
    an indication of the first MCS and the second MCS,
    an indication of the first MCS and a difference requested for the second MCS,
    an indication of the second MCS and a difference requested for the first MCS,
    an indication of a difference requested for the second MCS from the first MCS as previously indicated or to be indicated after the request, or
    an indication of a difference requested for the first MCS from the second MCS as previously indicated or to be indicated after the request.

12. The UE of claim 10, wherein the one or more processors are configured to transmit or receive the request via one or more of:
    a periodic medium access control (MAC) control element (CE), an aperiodic MAC CE,
a periodic radio resource control (RRC) communication, or
an aperiodic RRC communication.

13. A network node for wireless communication, comprising:
a memory; and
one or more processors, coupled to the memory, configured to:
receive an indication of a capability of a user equipment (UE) to receive or transmit a time domain communication having a first portion of a symbol configured with a first modulation and coding scheme (MCS) and a second portion of the symbol configured with a second MCS that is different from the first MCS, wherein the second portion of the symbol includes a first sub-portion at a beginning of the symbol and a second sub-portion at an end of the symbol based at least in part on the first sub-portion and the second sub-portion being associated with extrapolation for phase noise estimation, or wherein the second portion of the symbol comprises a center portion of the symbol based at least in part on the center portion of the symbol being separated by a threshold amount of time from a time domain reference signal; and
transmit or receive the time domain communication having the first portion of the symbol configured with the first MCS and the second portion of the symbol configured with the second MCS.

14. The network node of claim 13, wherein the time domain communication comprises one or more of:
a discrete Fourier transform spread orthogonal frequency division multiplexing (DFT-s-OFDM) waveform, or
a time domain waveform.

15. The network node of claim 13, wherein the time domain communication comprises:
one or more time domain phase tracking reference signals (TD-PTRSs) on one or more samples of the time domain communication.

16. The network node of claim 13, wherein the first portion of the symbol comprises one or more of:
an amount of phase noise that satisfies a phase noise threshold, or
a reference signal allocation that satisfies a reference signal threshold.

17. The network node of claim 16, wherein the first portion of the symbol is configured with the first MCS based at least in part on one or more of the amount of phase noise satisfying the phase noise threshold or the reference signal allocation satisfying the reference signal threshold.

18. The network node of claim 13, wherein the one or more processors are further configured to:
transmit an indication of a resource allocation for transmitting or receiving the time domain communication,
wherein the resource allocation indicates that the time domain communication is to have the first portion of the symbol configured with the first MCS and the second portion of the symbol configured with the second MCS.

19. The network node of claim 13, wherein the first MCS has a first coding rate and a first modulation order constellation,
wherein the second MCS has a second coding rate and a second modulation order constellation, and
wherein the first coding rate is different from the second coding rate or the first modulation order constellation is different from the second modulation order constellation.

20. The network node of claim 19, wherein the first modulation order constellation is different from the second modulation order constellation,
wherein the first portion of the symbol and the second portion of the symbol are configured with a same coding rate,
wherein the first portion of the symbol and the second portion of the symbol are portions of a same transfer block,
wherein the first portion of the symbol has a first number of samples per code block,
wherein the second portion of the symbol has a second number of samples per code block that is different from the first number of bits per code block, and
wherein the time domain communication uses rate matching based at least in part on the second number of samples per code block being different from the first number of samples per code block.

21. The network node of claim 19, wherein the first coding rate is different from the second coding rate, and
wherein the first portion of the symbol is associated with a first transfer block and the second portion of the symbol is associated with a second transfer block.

22. The network node of claim 13, wherein the one or more processors are further configured to:
transmit or receive a request to use different MCSs for the first portion of the symbol and the second portion of the symbol.

23. The network node of claim 22, wherein the request indicates one or more of:
an indication of the first MCS and the second MCS,
an indication of the first MCS and a difference requested for the second MCS,
an indication of the second MCS and a difference requested for the first MCS,
an indication of a difference requested for the second MCS from the first MCS as previously indicated or to be indicated after the request, or
an indication of a difference requested for the first MCS from the second MCS as previously indicated or to be indicated after the request.

24. The network node of claim 22, wherein the one or more processors, to transmit or receive the request, are configured to transmit or receiving the request via one or more of:
a periodic medium access control (MAC) control element (CE),
an aperiodic MAC CE,
a periodic radio resource control (RRC) communication, or
an aperiodic RRC communication.

25. A method of wireless communication performed by a user equipment (UE), comprising:
transmitting an indication of a capability to receive or transmit a time domain communication having a first portion of a symbol configured with a first modulation and coding scheme (MCS) and a second portion of the symbol configured with a second MCS that is different from the first MCS, wherein the second portion of the symbol includes a first sub-portion at a beginning of the symbol and a second sub-portion at an end of the symbol based at least in part on the first sub-portion and the second sub-portion being associated with extrapolation for phase noise estimation, or wherein the second portion of the symbol comprises a center portion of the symbol based at least in part on the center portion of the symbol being separated by a threshold amount of time from a time domain reference signal; and receiving or transmitting the time domain communication having the first portion of the symbol configured with the first MCS and the second portion of the symbol configured with the second MCS.

26. The method of claim 25, wherein the first portion of the symbol comprises one or more of:
   an amount of phase noise that satisfies a phase noise threshold, or
   a reference signal allocation that satisfies a reference signal threshold.

27. The method of claim 26, wherein the first portion of the symbol is configured with the first MCS based at least in part on one or more of the amount of phase noise satisfying the phase noise threshold or the reference signal allocation satisfying the reference signal threshold.

28. A method of wireless communication performed by a network node, comprising:
   receiving an indication of a capability of a user equipment (UE) to receive or transmit a time domain communication having a first portion of a symbol configured with a first modulation and coding scheme (MCS) and a second portion of the symbol configured with a second MCS that is different from the first MCS, wherein the second portion of the symbol includes a first sub-portion at a beginning of the symbol and a second sub-portion at an end of the symbol based at least in part on the first sub-portion and the second sub-portion being associated with extrapolation for phase noise estimation, or wherein the second portion of the symbol comprises a center portion of the symbol based at least in part on the center portion of the symbol being separated by a threshold amount of time from a time domain reference signal; and transmitting or receiving the time domain communication having the first portion of the symbol configured with the first MCS and the second portion of the symbol configured with the second MCS.

29. The method of claim 28, wherein the first portion of the symbol comprises one or more of:
   an amount of phase noise that satisfies a phase noise threshold, or
   a reference signal allocation that satisfies a reference signal threshold.

30. The method of claim 29, wherein the first portion of the symbol is configured with the first MCS based at least in part on one or more of the amount of phase noise satisfying the phase noise threshold or the reference signal allocation satisfying the reference signal threshold.

\* \* \* \* \*